June 11, 1940.   R. M. HEINTZ   2,204,492
ENGINE CONTROL MECHANISM
Filed Feb. 28, 1939
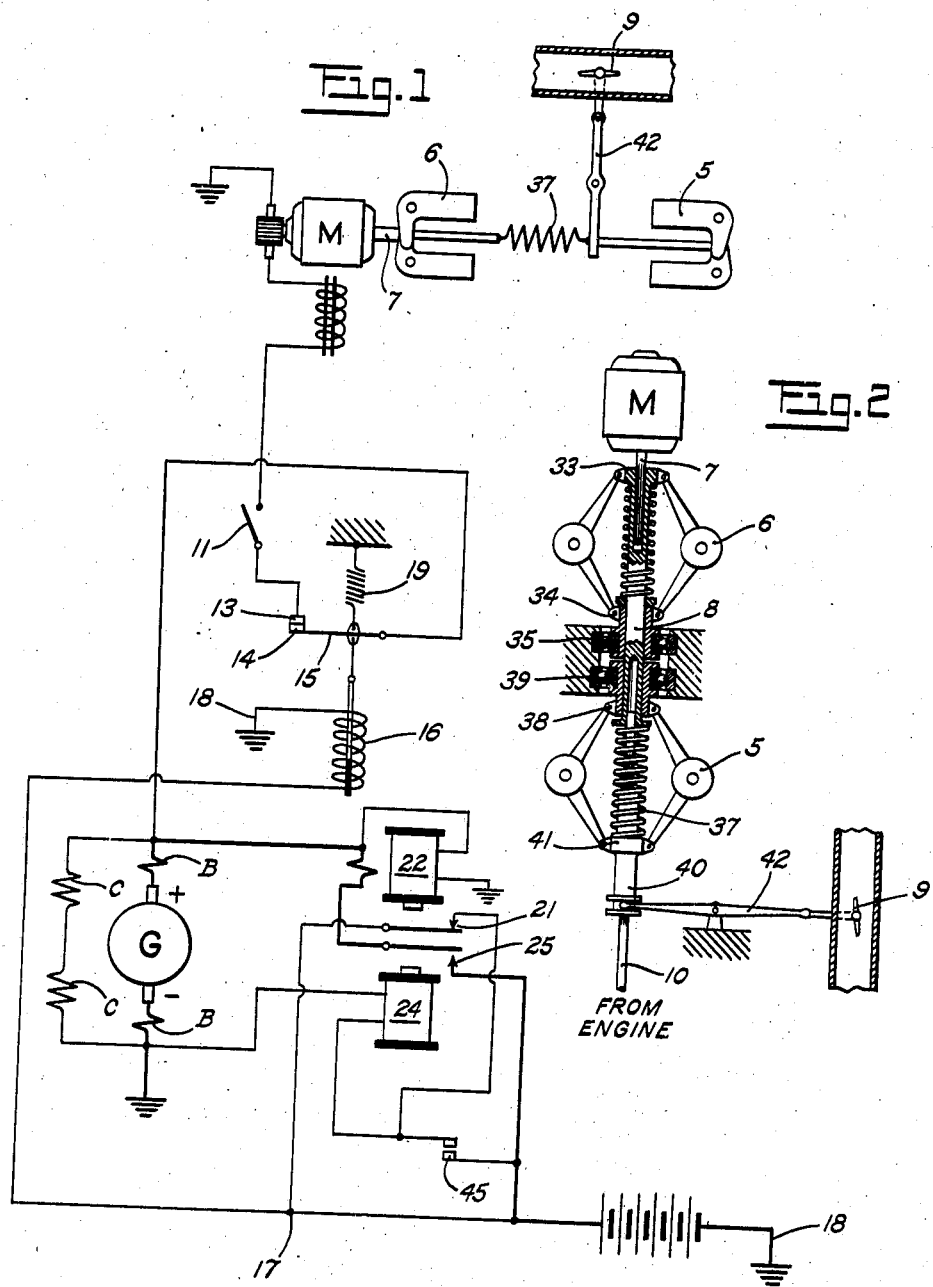
INVENTOR.
Ralph M. Heintz
BY Martin J. Finnegan
ATTORNEY.

Patented June 11, 1940

2,204,492

UNITED STATES PATENT OFFICE 2,204,492

ENGINE CONTROL MECHANISM

Ralph M. Heintz, Montclair, N. J., assignor to Bendix Aviation Corporation, South Bend, Ind., a corporation of Delaware Application February 28, 1939, Serial No. 259,016

2 Claims. (Cl. 123—102)

This invention relates to internal combustion engines, and particularly to the control of the speed thereof.

An object of the invention is to provide, in an engine installation including a throttle regulating governor, novel means for controlling the governor setting.

Another object is to provide, in a spring-loaded governor mechanism, novel means for varying the spring setting in accordance with load conditions. In this connection a feature of the invention, of special significance when the engine is employed as the power supply for operation of a direct current generator, is the concept of using the electrical demand placed upon the generator as the controlling factor in engine speed regulation. In such a use of the invention the governor and generator controls will be coordinated in such manner as to permit economy in engine operation, by holding the engine speed at a fraction of its normal full speed capabilities during periods of low electrical demand, and by stepping up the engine to full speed only when the electrical demand rises correspondingly.

When taking full capacity output from an engine-driven generator running at full speed, the engine losses ordinarily do not exceed a tolerable proportion of the indicated horse-power; but on reducing the electrical demand to some lower figure, these losses (traceable to friction, windage, cooling fan and/or supercharger operation, etc.) may become several times the useful output, and instead of getting three-fourths of a kilowatt, for example, from a pound of fuel, the output may drop to a hundred watts or possibly less.

While the pumping losses vary more or less directly with speed, the friction losses vary about as the 3/2 power and the windage, supercharger and fan losses vary as the square of the speed. Moreover, windage and brush friction are purely functions of speed; and generator eddy current losses and pole face losses are likewise functions of the armature frequency, which is to say that they also vary with speed.

Although it is true that these losses may not be great as a proportion of the full load output, they are nevertheless a considerable proportion of the output at, say, ¼ load. In other words, a generator which might have an efficiency of 75% at full load, when operating at ¼ load and still running at full speed might have its efficiency reduced to 30% or lower. It follows that for highest efficiency the engine-generator should run just as fast as and no faster than is necessary to supply the electrical demand of the moment.

It is accordingly an object of this invention to provide a method of operation wherein, on the one hand, the engine speed is governed by the electrical demand, and on the other hand, substantially constant (rated) voltage is maintained across the terminals of the engine-driven generator, both during part load and full load conditions. Thus the old concept of a single maximum speed is replaced by the new concept of variable speed operation, with a different "maximum" speed for each load condition, but with full rated voltage at all times.

The attainment of this flexibility in speed governing involves the provision of two or more governors, one of which acts directly upon the engine throttle (or equivalent fuel feed) while a second governor operates to control the governing action of the first (as by modifying its spring loading to meet changes in the power demand).

Any governing system can be likened to an electrical system having inductance, capacitance and resistance. Like such an electrical system, the governor system can oscillate. If there is no resistance, the oscillations are undamped and continuous. If the resistance is small, the damping is slight and only a small amount of energy is necessary to keep the system oscillating as, for example, the balance wheel of a watch. If more resistance is added, the oscillations are still further damped; and if enough resistance is added, the oscillations will cease.

In an electrical system, resistance might be added, or energy fed in reverse to eliminate the oscillations. In some governors, friction supplies the resistance, or a dash-pot or other "snuffer" is used. In the present invention, on the other hand, the tendency to oscillate at high speed is effectively neutralized by the "follow-up" action of the secondary, or pilot, governor which comes into play to change the amplification ratio of the main governor and thereby introduce a "neutralization" factor which effectively combats the oscillating tendency.

A further object of the invention, therefore, is to provide a governor system involving two or more governors, one of which is driven continuously by the engine, while a secondary, or pilot, governor is driven at varying speed by a driving motor which is rapidly energized and de-energized, according to the need for stabilization in the action of the engine-driven governor.

These and other objects of the invention will become apparent from inspection of the following specification when read with reference to the accompanying drawing wherein is illustrated the preferred embodiment of the invention. It is to be expressly understood, however, that the drawings are for the purpose of illustration only, and are not designed as a definition of the limits of the invention, reference being had to the appended claims for this purpose.

In the drawing,

Fig. 1 is a diagram of the system in its preferred embodiment.

Fig. 2 is a sectional view of a structure suitable for use in the system of Fig. 1.

In the drawing the above described main governor is shown at 5, the pilot governor at 6, motor and engine driven shafts at 7 and 10, respectively, a motor at M, an engine-driven generator at G, and at 9 is shown a throttle valve controlling the supply of fuel to the intake manifold of the engine which drives the generator G and the main governor drive shaft 10.

The motor energizing circuit includes, in addition to the direct current source G, a hand switch 11 and an automatic switch having contacts 13, 14 one of which is adapted to be carried by an armature piece 15 constituting part of the magnetic circuit of an electromagnet whose winding 16 is connected across the battery terminals, as indicated at 17 and 18, and which winding therefore reflects the voltage conditions existing in the line. A suitable spring 19 is effective to hold the armature contact 14 in its uppermost position except when the line voltage rises above the normal (rated) value.

The generator G has its armature winding in series with the series fields B and in parallel with the shunt fields C; and in order to develop the same line (rated) voltage during low demand, low speed operation as is developed during full demand, top speed operation, I propose to employ a field compounding method that will produce near-saturation of the fields at low speed, but with a falling off from this near-saturation value as the speed rises—that is, before the eddy current losses and harmonic generation (which are negligible at low speed) have a chance to become severe. The field structure which I employ involves both shunt and series windings, and further involves reversing the series winding, as a result of which reversal the current passing through the series coils tends to cancel some of the flux due to the shunt field windings, thereby weakening the total field by erasing a variable proportion of the total flux, the percentage erased being substantially proportional to each speed increase, until at top speed the amount of erased flux is just enough to permit flow of rated line current at the same voltage as that which is obtained at the lower speeds, namely, the rated line voltage (the shunt field being, of course, made of sufficient size to assure attainment of the rated line voltage at the lowest running speed).

Reference character 21 designates the contacts of a reverse-current relay 22 which is of conventional construction for the establishment of unidirectional current flow between the generator G and the battery 23, except that its contacts 21 are in the circuit of the main contactor coil 24 instead of being interposed in the main line itself; hence the opening of contacts 21 de-energizes coil 24 and thus breaks the main line circuit at the contacts 25 of the main contactor 24. This novel arrangement (not claimed in this application) makes it possible to reduce the size of relay 22.

The mechanical connections between the pilot governor 6 and the main governor spring 37 may take any desired form, but as shown include a hollow shaft or sleeve 8 splined to the armature shaft extension 7 of the pilot motor M, and having a collar portion 33 to receive the upper arms of the governor 6, the lower arms of which are received in the lower collar 34 which is held against axial movement by suitable bearing means 35, so that sleeve 8 may slide freely therewithin in response to the action of centrifugal force upon the revolving weights of the governor. The flanged base of sleeve 8 abuts spring 37 of the main governor 5, whose upper collar 38 is rotatable in a bearing 39 which prevents axial movement thereof, while its lower collar 41 is an integral part of a sleeve 40 that is splined to the engine driven shaft 10 by which it is drivably connected to the engine, for rotation thereby. A pivotally mounted lever 42 has one end yoked within flanges on sleeve 40, to be shifted as the sleeve 40 is moved axially by the governor, the other end of the lever being operatively connected to the engine throttle valve 9.

On starting the engine (and assuming switch 11 to be left open, for low speed, low demand operation), the main governor 5 will take charge and move the throttle to the low speed position. Switch 45 is then closed, momentarily, producing flow of current to energize main contactor coil 24 and thus close contacts 25 to permit charging of the battery.

Now, if occasion should arise to require a higher electrical output, the engine speed will be stepped up by closing switch 11. Closure of switch 11 will energize motor M, thereby spreading the arms of governor 6 and correspondingly shifting the governor sleeve 8 (downwardly) to increase the load on spring 37 of governor 5. This causes the arms of governor 5 to swing at a narrower radius, and lowers the governor sleeve 40 correspondingly, (in the arrangement shown in Fig. 2) thereby moving the throttle valve 9 toward full-open position and speeding up the engine.

The resulting increase in generator output takes care of the added electrical demand, but does not necessarily produce any substantial voltage increase, due to the reverse, or differential, compounding of the generator field windings, as above described. However, if the speed rises slightly above the rated maximum, the resulting excess voltage will cause regulator 16 to open contacts 13, 14 and thus de-energize (momentarily) the motor M. The resulting falling off in the speed of governor 6 permits governor 5 to assert itself sufficiently to reduce the speed and voltage to the rated values. This cycle of alternate energization and de-energization of motor M will be repeated as often as is necessary to maintain proper voltage and speed, and so long as switch 11 remains closed—that is, until a falling off in electrical requirements renders it advisable, in the interest of economy of fuel, etc., to re-open switch 11 and restore the engine to low speed condition, under the sole control of governor 5.

What I claim is:

1. In combination with a variable speed internal combustion engine having an engine speed controlling governor thereon, means including an electric motor for varying the governor loading, and automatic means for energizing said motor, said automatic means including a source of current, a circuit from said source to said motor, and means responsive to an excessive voltage across the terminals of said source for preventing current flow in said circuit and thereby preventing excessive loading of said governor.

2. In combination with a variable speed internal combustion engine having an engine speed controlling governor thereon, means including an electric motor and a second governor for varying the governor loading, and automatic means for energizing said motor, said automatic means including a source of current, a circuit from said source to said motor, and means responsive to an excessive voltage across the terminals of said source for preventing current flow in said circuit and thereby preventing excessive loading of the first-named governor.

RALPH M. HEINTZ.